US012749494B2

(12) United States Patent
Pfeifenberger et al.

(10) Patent No.: US 12,749,494 B2
(45) Date of Patent: *Sep. 29, 2026

(54) SYSTEM AND METHOD FOR AUTOMATIC ALIGNMENT OF PHONETIC CONTENT FOR REAL-TIME ACCENT CONVERSION

(71) Applicant: Sanas.ai Inc., Palo Alto, CA (US)

(72) Inventors: Lukas Pfeifenberger, Salzburg (AT); Shawn Zhang, Palo Alto, CA (US)

(73) Assignee: Sanas.ai Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/397,799

(22) Filed: Nov. 21, 2025

(65) Prior Publication Data

US 2026/0128051 A1 May 7, 2026

Related U.S. Application Data

(63) Continuation of application No. 18/905,439, filed on Oct. 3, 2024, which is a continuation of application (Continued)

(51) Int. Cl.
*G10L 21/007* (2013.01)
*G06F 3/16* (2006.01)
(Continued)

(52) U.S. Cl.
CPC ............ *G10L 21/007* (2013.01); *G06F 3/162* (2013.01); *G10L 13/00* (2013.01); *G10L 13/033* (2013.01);
(Continued)

(58) Field of Classification Search
CPC ......... G10L 15/02; G10L 15/26; G10L 13/00; G10L 15/063; G10L 2021/0135;
(Continued)

(56) References Cited

U.S. PATENT DOCUMENTS 10,176,819 B2 * 1/2019 Sun ........................ G10L 15/187
10,186,251 B1 * 1/2019 Mohammadi ........... G10L 15/26
(Continued)

FOREIGN PATENT DOCUMENTS

WO 2022/057759 A1 3/2022

OTHER PUBLICATIONS

Aryal et al., "Articulatory-based conversion of foreign accents with deep neural networks." Sixteenth Annual Conference of the International Speech Communication Association (Year: 2015).*
(Continued)

*Primary Examiner* — Samuel G Neway
(74) *Attorney, Agent, or Firm* — Troutman Pepper Locke LLP

(57) ABSTRACT

The disclosed technology relates to methods, accent conversion systems, and non-transitory computer readable media for real-time accent conversion. In some examples, a set of phonetic embedding vectors is obtained for phonetic content representing a source accent and obtained from input audio data. A trained machine learning model is applied to the set of phonetic embedding vectors to generate a set of transformed phonetic embedding vectors corresponding to phonetic characteristics of speech data in a target accent. An alignment is determined by maximizing a cosine distance between the set of phonetic embedding vectors and the set of transformed phonetic embedding vectors. The speech data is then aligned to the phonetic content based on the determined alignment to generate output audio data representing the target accent. The disclosed technology transforms phonetic characteristics of a source accent to match the target accent more closely for efficient and seamless accent conversion in real-time applications.

20 Claims, 3 Drawing Sheets

Related U.S. Application Data

No. 18/754,280, filed on Jun. 26, 2024, now Pat. No. 12,131,745.

(60) Provisional application No. 63/510,487, filed on Jun. 27, 2023.

(51) Int. Cl.

| | |
|---|---|
| ***G10L 13/00*** | (2006.01) |
| ***G10L 13/033*** | (2013.01) |
| ***G10L 15/02*** | (2006.01) |
| ***G10L 15/06*** | (2013.01) |
| ***G10L 15/16*** | (2006.01) |
| ***G10L 15/26*** | (2006.01) |
| ***G10L 21/003*** | (2013.01) |
| ***G10L 21/01*** | (2013.01) |
| ***G10L 21/013*** | (2013.01) |

(52) U.S. Cl.

CPC ............ *G10L 15/02* (2013.01); *G10L 15/063* (2013.01); *G10L 15/16* (2013.01); *G10L 15/26* (2013.01); *G10L 21/003* (2013.01); *G10L 21/013* (2013.01); *G10L 21/01* (2013.01); *G10L 2021/0135* (2013.01)

(58) Field of Classification Search

CPC ... G10L 21/007; G10L 21/003; G10L 21/013; G10L 21/01; G10L 15/16; G10L 13/033

See application file for complete search history.

(56) References Cited

U.S. PATENT DOCUMENTS

| | | | | |
|---|---|---|---|---|
| 10,909,459 | B2 | 2/2021 | Tsatsin et al. | |
| 11,450,332 | B2 | 9/2022 | Kameoka et al. | |
| 11,664,037 | B2 | 5/2023 | Lim et al. | |
| 12,131,745 | B1 * | 10/2024 | Pfeifenberger | G10L 13/00 |
| 12,217,761 | B2 | 2/2025 | Chen et al. | |
| 12,400,078 | B1 | 8/2025 | Vyas et al. | |
| 2004/0148161 | A1 * | 7/2004 | Das | G10L 21/00 704/E21.001 |
| 2008/0219459 | A1 | 9/2008 | Bongiovi | |
| 2013/0246064 | A1 | 9/2013 | Wasserblat et al. | |
| 2014/0148933 | A1 | 5/2014 | King et al. | |
| 2018/0174595 | A1 | 6/2018 | Dirac et al. | |
| 2018/0342258 | A1 * | 11/2018 | Huffman | G10L 21/013 |
| 2020/0193971 | A1 | 6/2020 | Feinauer | |
| 2020/0294492 | A1 | 9/2020 | Sypniewski et al. | |
| 2021/0193160 | A1 * | 6/2021 | Wang | G06N 3/09 |
| 2021/0272571 | A1 | 9/2021 | Balasubramaniam | |
| 2022/0013107 | A1 | 1/2022 | Wintrode | |
| 2022/0122579 | A1 * | 4/2022 | Biadsy | G10L 13/02 |
| 2022/0246132 | A1 | 8/2022 | Zhang et al. | |
| 2022/0358903 | A1 * | 11/2022 | Serebryakov | G10L 13/02 |
| 2023/0223006 | A1 * | 7/2023 | Fan | H04M 1/72433 704/231 |
| 2023/0335107 | A1 * | 10/2023 | Zhao | G10L 15/16 |
| 2023/0352001 | A1 * | 11/2023 | Carmiel | G10L 13/10 |
| 2024/0304175 | A1 * | 9/2024 | Erdmann | G10L 13/047 |
| 2024/0304200 | A1 | 9/2024 | Keshet et al. | |
| 2024/0347070 | A1 * | 10/2024 | Pfeifenberger | G10L 13/033 |
| 2025/0029622 | A1 * | 1/2025 | Pfeifenberger | G10L 21/013 |
| 2025/0157477 | A1 * | 5/2025 | Gaznepoglu | G10L 25/03 |

OTHER PUBLICATIONS

Liu et al., "End-to-end accent conversion without using native utterances." ICASSP 2020-2020 IEEE International Conference on Acoustics, Speech and Signal Processing (ICASSP). IEEE (Year: 2020).*

Marco Cuturi and Mathieu Blondel, "Soft-DTW: a Differentiable Loss Function for Time-Series", pp. 1-10, Proceedings of the 34th International Conference on Machine Learning, Sydney, Australia, PMLR 70 (2017).

Tanton, James, "Encyclopedia Of Mathematics", ISBN 0-8160-5124-0 Facts On File, Inc. (2005).

Ding et al., "Accentron: Foreign Accent Conversion to Arbitrary Non-Native Speakers Using Zero-Shot Learning", Computer Speech & Language 72(101302):1-45 (2022).

C. Schmandt, "Voice Communication with Computers", ISBN 0-442 23935-1 Van Nostrand Reinhold (1994).

C. O'Callaghan, "Pitch" pp. 1-35 Sep. 30, 2015.

Sisman et al., "Group Sparse Representation with WaveNet Vocoder Adaptation for Spectrum and Prosody Conversion", IEEE/ACM Transactions on Audio, Speech, and Language Processing 27(6):1085-1097 (2019).

J. Holmes and W. Holmes, "Speech Synthesis and Recognition", Second Edition, ISBN 0-7484-0856-8 (hc.)-ISBN 0-7484-0857-6 (pbk.), Taylor & Francis e-Library ("2003").

H. Fletcher and W. A. Munson, "Loudness, Its Definition, Measurement and Calculation," Bell Telephone Laboratories V(4):82-108 ("1933").

Ding et al., "Personal VAD: Speaker-Conditioned Voice Activity Detection", arXiv:1908.04284 [eess.AS] pp. 1-7 Apr. 8, 2020.

C. Wiltshire, "English Sounds in Context: The Pronunciation of Phonemes and Morphemes", Chapter 13, Applied Linguistics for Teachers of Culturally and Linguistically Diverse Learners pp. 303-324 (2019).

Kazanina et al., "Phonemes: Lexical Access and Beyond", Psychon Bull Rev 25:560-585 (2017).

Jurafsky et al., "Speech and Language Processing", Chapter 27, Phonetics pp. 1-29 (2019).

Sun et al., "Phonetic Posteriorgrams For Many-To-One Voice Conversion Without Parallel Data Training", IEEE on Multimedia and Expo pp. 1-6 Aug. 29, 2016.

L. Roberts, "Understanding the Mel Spectrogram", Medium Analytics Vidhya Mar. 5, 2020.

N. Umeda, "Consonant Duration in American English", The Journal of the Acoustical Society of America 61(3):846-858 Mar. 1, 1977.

Liu et al., "End-to-End Accent Conversion Without Using Native Utterances", 2020 IEEE Int'l Conf. on Acoustics, Speech, and Signal Processing (ICASSP) 6289-6293 (2020).

Wang et al., "Tacotron: Towards End-to End Speech Synthesis", arXiv:1703.10135 [cs.CL] pp. 1-10, Apr. 6, 2017.

Zhao et al., "Converting Foreign Accent Speech Without a Reference", IEEE/ACM Transactions on Audio, Speech, and Language Processing 29:2367-2381 (2021).

Khorram et al., "Trainable Time Warping: Aligning Time Series in the Continuous-Time Doman", IEEE International Conference on Acoustics, Speech and Signal Processing (ICASSP) pp. 1-5 Mar. 21, 2019.

Gao, Shuhua, et al, "Development of a computationally efficient voice conversion system on mobile phones," vol. 8, 2019.

Ding, Shaojin, et al, "Improving the Speaker Identity of Non-Parallel Many-to-Many Voice Conversion with Adversarial Speaker Recognition," Interspeech 2020, pp. 776-780, Oct. 25-29, 2020.

Zhao, Guanlong, et al, "Foreign Accent Conversion by Synthesizing Speech from Phonetic Posteriorgrams," Interspeech 2019, pp. 2843-2847, Sep. 15-19, 2019.

Guanlong Zhao FAC-via-PPG demo page, https://guanlongzhao.github.io/demo/fac-via-ppg/, retrieved on Aug. 13, 2026.

Guanlong Zhao FAC-via-PPG public github repository, https://github.com/guanlongzhao/fac-via-ppg, retrieved on Aug. 13, 2026.

Guanlong Zhao FAC-via-PPG public github repository, fac-via-ppg/src/ppg/compute_ppg.py, https://github.com/guanlongzhao/fac-via-ppg/blob/master/src/ppg/compute_ppg.py, retrieved on Aug. 13, 2026.

Guanlong Zhao FAC-via-PPG public github repository, fac-via-ppg/src/common/model.py, https://github.com/guanlongzhao/fac-via-ppg/blob/master/src/common/model.py, retrieved on Aug. 13, 2026.

Guanlong Zhao FAC-via-PPG public github repository, fac-via-ppg/src/script/train_ppg2mel.py,https://github.com/guanlongzhao/fac-via-ppg/blob/master/src/script/train_ppg2mel.py, retrieved on Aug. 13, 2026.

(56) References Cited

OTHER PUBLICATIONS

Guanlong Zhao FAC-via-PPG public github repository, fac-via-ppg/src/script/generate_synthesis.py, https://github.com/guanlongzhao/fac-via-ppg/blob/master/src/script/generate_synthesis.py, retrieved on Aug. 13, 2026.
Guanlong Zhao FAC-via-PPG public github repository, fac-via-ppg/src/waveglow/, https://github.com/guanlongzhao/fac-via-ppg/tree/master/src/waveglow, retrieved on Aug. 13, 2026.
L2-ARCTIC: a non-native English speech corpus, https://psi.engr.tamu.edu/12-arctic-corpus/, retrieved on Aug. 13, 2026.
Ding, Shaojin Ding et al, "Personal VAD: SPeaker-Conditioned Voice Activity Detection," Electrical Engineering and Systems Science, 2020.
Sisman, Berrak, "Group Sparse Representation with WaveNet Vocoder Adaptation for Spectrum and Prosody Conversion," IEE/ACM Transactions on Audio, Speech, and Language Processing, vol. 27, No. 6, Jun. 2019.
Ding, Shaojin, "Accentron: Foreign Accent Conversion to Arbitrary Non-Native Speakers Using Zero-Shot Learning," Computer Speech and Language, 2021.
Guanlong Zhao Accentron Jounral Pre-proof, https://guanlongzhao.github.io/media/publication/ding2021csl. pdf, 2021.
Guanlong Zhao Accentron PowerPoint https://courses.grainger.illinois.edu/ECE590SIC/sp2024/Accentron.pdf, 2022.
Guanlong Zhao public github repository https://guanlongzhao.github.io, retrieved on Aug. 13, 2026.
Shaojin Ding Accentron Sample https://shaojinding.github.io/samples/accentron/, retrieved on Aug. 13, 2026.
CMU_ARCTIC database http://www.festvox.org/cmu_arctic/, retrieved on Aug. 13, 2026.

* cited by examiner

SYSTEM AND METHOD FOR AUTOMATIC ALIGNMENT OF PHONETIC CONTENT FOR REAL-TIME ACCENT CONVERSION

This application is a continuation of U.S. patent application Ser. No. 18/905,439, filed Oct. 3, 2024, which is a continuation of U.S. patent application Ser. No. 18/754,280, filed Jun. 26, 2024 (now U.S. Pat. No. 12,131,745, issued Oct. 29, 2024), which claims priority to U.S. Provisional Patent Application Ser. No. 63/510,487, filed Jun. 27, 2023, each which is hereby incorporated herein by reference in its entirety.

FIELD

This technology generally relates to audio analysis and, more particularly, to methods and systems for automatic alignment of phonetic content for real-time accent conversion.

BACKGROUND

Real-time accent conversion relates to the process of transforming speech from one accent to another accent in real-time. For instance, a speaker with an Indian accent could have their speech automatically converted into an American accent while they are speaking. This transformation process involves aligning phonetically dissimilar audio of two accents, which can be challenging due to the unique pronunciation styles of each speaker and associated accent.

One approach to aligning two audio sequences uses a dynamic time warping (DTW) algorithm. DTW finds optimal temporal alignment of two sequences by stretching or compressing them in time. However, DTW has limitations, such as being non-differentiable and not providing gradient information. As a result, training an accent conversion model of an accent conversion system using DTW requires two separate steps. The first step involves using DTW to align the audio of the two accents and the second step involves training the accent conversion model using the aligned data. This approach can limit the overall performance of the accent conversion system since the accent conversion model can only learn from the aligned data and not from the original audio.

Non-differentiability also is a significant issue that makes it difficult to train an accent conversion model effectively using DTW, thereby limiting its performance in real-world scenarios. Specifically, the non-differentiability of DTW makes it challenging to optimize current accent conversion systems using gradient-based methods, which are widely used in deep learning models. This limitation can lead to inaccuracies and errors in the accent conversion process and resulting poor-quality audio signals.

Non-monotonicity and instability are other significant issues that lead to alignment errors and negatively impact the accuracy of current accent conversion systems. Non-monotonicity refers to the fact that some alignment algorithms, including DTW, do not always guarantee that the alignment will be strictly increasing in time. This may lead to alignment errors and result in inaccurate accent conversions. Instability refers to the fact that the alignment algorithm may produce different results when the input signals are slightly perturbed, leading to inconsistencies in the accent conversion process.

Other deficiencies of existing accent conversion methods is that they do not handle complex accents that deviate significantly from the data used to train the accent conversion model. In such cases, current accent conversion systems may produce inaccurate or inconsistent results. Additionally, existing accent conversion methods are not able to capture the nuances and variations of different accents accurately, which may affect the naturalness and intelligibility of the converted speech. Furthermore, existing accent conversion methods require a significant amount of training data, which may be a challenge to collect and annotate, limiting the scalability of current systems and making it challenging for current systems to adapt to new accents or languages.

These and other limitations make it challenging to develop and deploy effective real-time accent conversion models and systems to accurately convert accented speech in different audio signals. Accordingly, current accent conversion systems have limited performance, accuracy, and effectiveness for real-time accent conversion.

BRIEF DESCRIPTION OF THE DRAWINGS

The disclosed technology is illustrated by way of example and not limitation in the accompanying figures, in which like references indicate similar elements.

DETAILED DESCRIPTION

Figure 1:
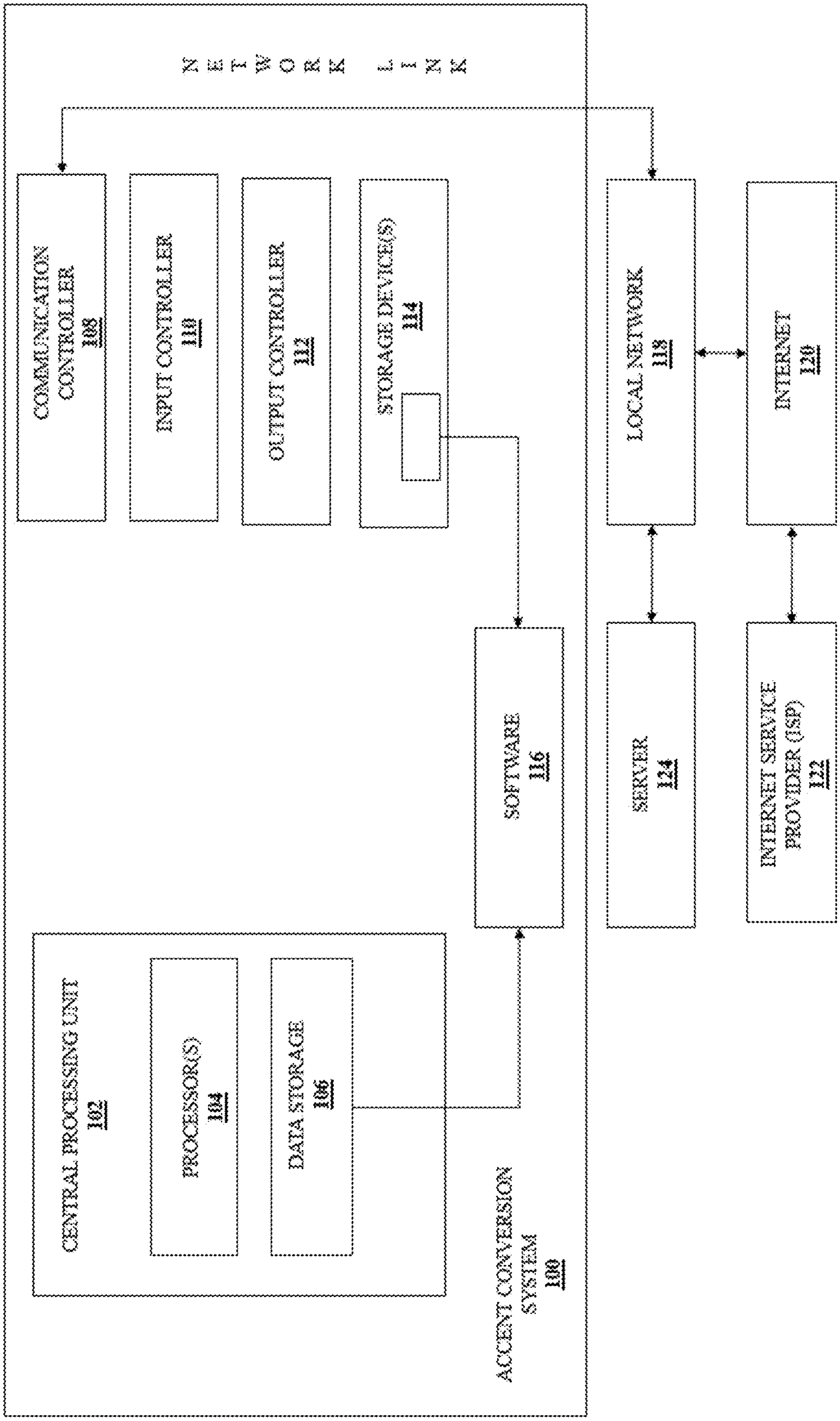
FIG. 1 is a block diagram of an exemplary network environment that includes an accent conversion system.

Examples described below may be used to provide a method, a device (e.g., non-transitory computer readable medium), an apparatus, and/or a system for automatic alignment of phonetic content for real-time accent conversion. Although the technology has been described with reference to specific examples, various modifications may be made to these examples without departing from the broader spirit and scope of the various embodiments of the technology described and illustrated by way of the examples herein.

With this technology, a set of phonetic embedding vectors that represent a source accent is received and a set of transformed phonetic embedding vectors that represent a target accent is predicted using a machine learning model (e.g., an accent conversion neural network). The disclosed technology achieves alignment by maximizing the cosine distance between the two sets of phonetic embedding vectors. Based on this alignment, the phonetic content of the source accent is automatically aligned with the target accent.

Accordingly, this technology enables an accent conversion neural network, for example, to accurately transform the phonetic characteristics of the source accent to closely match the target accent, allowing for efficient and seamless accent conversion in real-time applications. The technology enables efficient and real-time accent conversion, thereby facilitating the processing of speech data in various practical applications such as voice assistants, language learning tools, and speech recognition systems.

In some examples, the disclosed technology may include several components such as audio input, pre-trained phonetic embedding vectors, a neural network model, a gradient-based optimization algorithm, loss functions, training data, and/or a user interface, each of which is described and illustrated in detail below. The technology may include obtaining audio recordings of two different accents and using pre-trained phonetic embedding vectors to quantify the similarity between those accents. An accent conversion neural network machine learning model may then be employed to predict the set of phonetic embedding vectors representing the target accent.

To achieve alignment, a gradient-based optimization algorithm may be utilized to automatically derive an alignment between the two sets of phonetic embedding vectors. The alignment may ensure stability and monotonicity by incorporating various loss functions such as Loss1, Loss2, and Loss3. The gradient-based optimization algorithm may efficiently calculate the alignment by taking advantage of the mathematical properties of the phonetic embedding vectors, which may have a unit norm. The similarity between any two phonetic embedding vectors may be expressed using the cosine distance, which may range between −1 and 1. The user interface may provide real-time feedback on the converted speech, enabling users to adjust settings for optimal performance. Thus, the disclosed technology overcomes limitations in existing solutions and provides gradients for more efficient and effective training of the accent conversion system 100.

Referring now to FIG. 1, a block diagram of an exemplary network environment that includes an accent conversion system 100 is illustrated. The accent conversion system 100 in this example is configured for automatic alignment of phonetic content for real-time accent conversion and includes processor(s) 104, which are designed to process instructions (e.g., computer readable instructions (i.e., code)) stored on the storage device(s) 114 (e.g., a non-transitory computer readable medium) of the accent conversion system 100. By processing the stored instructions, the processor(s) 104 may perform one or more of the steps and/or functions disclosed herein, such as with reference to FIG. 3 for example.

The storage device(s) 114 may be optical storage device (s), magnetic storage device(s), solid-state storage device(s) (e.g., solid-state disks (SSDs)) or non-transitory storage device(s), another type of memory, and/or a combination thereof, for example, although other types of storage device (s) can also be used. The storage device(s) 114 may contain software 116, which is a set of instructions (i.e., program code). Alternatively, instructions may be stored in one or more remote storage devices, for example storage devices (e.g., hosted by a server 124) accessed over a local network 118 or the Internet 120 via an Internet Service Provider (ISP) 122.

The accent conversion system 100 also includes an operating system and microinstruction code in some examples, one or both of which can be hosted by the storage device(s) 114. The various processes and functions described herein may either be part of the microinstruction code and/or program code (or a combination thereof), which is executed via the operating system. The accent conversion system 100 also may have data storage 106, which along with the processor(s) 104 form a central processing unit (CPU) 102, an input controller 110, an output controller 112, and/or a communication controller 108. A bus (not shown) may operatively couple components of the accent conversion system 100, including processor(s) 104, data storage 106, storage device(s) 114, input controller 110, output controller 112, and/or any other devices (e.g., a network controller or a sound controller).

Output controller 112 may be operatively coupled (e.g., via a wired or wireless connection) to a display device (e.g., a monitor, television, mobile device screen, touch-display, etc.) in such a fashion that output controller 112 can transform the display on the display device (e.g., in response to the execution of module(s)). Input controller 110 may be operatively coupled (e.g., via a wired or wireless connection) to an input device (e.g., mouse, keyboard, touchpad scroll-ball, touch-display, etc.) in such a fashion that input can be received from a user of the accent conversion system 100.

The communication controller 108 is coupled to a bus (not shown) in some examples and provides a two-way coupling through a network link to the Internet 120 that is connected to a local network 118 and operated by an ISP 122, which provides data communication services to the Internet. The network link typically provides data communication through one or more networks to other data devices. For example, a network link may provide a connection through local network 118 to a host computer and/or to data equipment operated by the ISP 122. A server 124 may transmit requested code for an application through the Internet 120, ISP 122, local network 118 and/or communication controller 108.

The accent conversion system 100 is illustrated in FIG. 1 with all components as separate devices for ease of identification only. One or more of the components of the accent conversion system 100 in other examples may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). The accent conversion system 100 also may be one or more servers, for example a farm of networked or distributed servers, a clustered server environment, or a cloud network of computing devices. Other network topologies can also be used in other examples.

Figure 2:
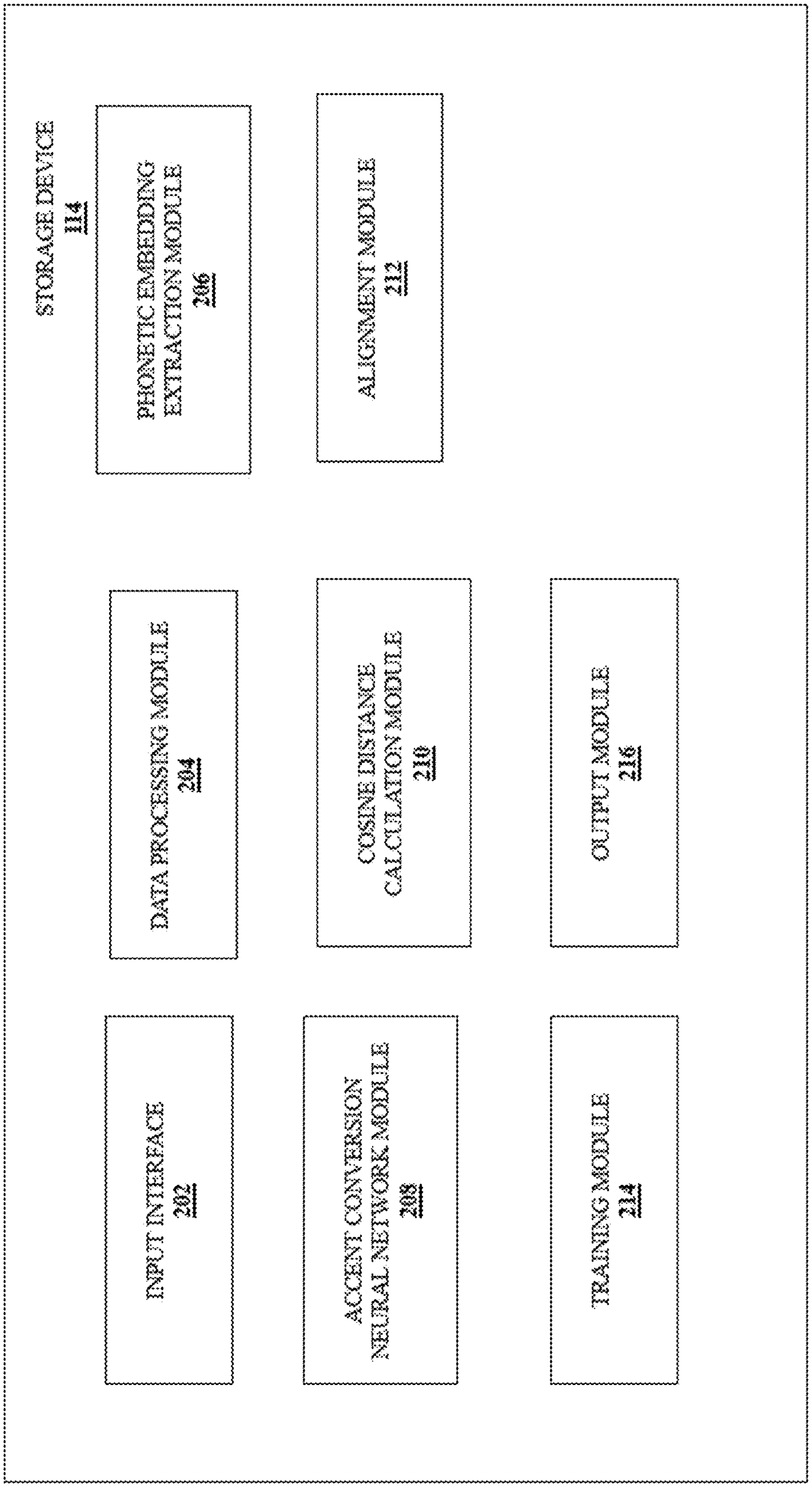
FIG. 2 is a block diagram of an exemplary storage device of the accent conversion system of FIG. 1.

Referring now to FIG. 2, a block diagram of an exemplary one of the storage device(s) 114 of the accent conversion system 100 is illustrated. The storage device(s) 114 may include an input interface 202, a data processing module 204, a phonetic embedding extraction module 206, an accent conversion neural network module 208, a cosine distance calculation module 210, an alignment module 212, a training module 214, and/or an output module 216, although other types and/or number of modules can also be used in other examples.

The input interface 202 may serve as an interface through which the accent conversion system 100 receives input data and may allow for the input of the phonetic content representing a source accent, which may be necessary for the accent alignment and conversion process. The phonetic content may be in the form of speech and/or audio data or any other representation that captures the phonetic characteristics of the source accent.

The input interface 202 may include various components or functionalities to facilitate the input process and may include hardware components like microphones or audio interfaces for capturing real-time speech data. Alternatively, input interface 202 may include a software interface that allows for the input of pre-recorded speech data or textual representations of the phonetic content, and other types of input interfaces can also be used in other examples.

Accordingly, the input interface 202 may facilitate the receipt by the accent conversion system 100 of the necessary data to initiate the accent alignment and conversion process described and illustrated herein. The input interface 202 may be the initial point of interaction between a user (e.g., a user computing device) or external systems and the accent conversion system 100. The input data provided through the input interface 202 may serve as the foundation for subsequent processing and analysis within the accent conversion system 100, as described and illustrated in detail below.

The data processing module 204 may handle the input data received from the input interface 202. The data processing module 204 may employ techniques such as signal processing, statistical analysis, or machine learning algorithms to extract meaningful information from the input data. This information may include phonetic features, linguistic characteristics, and/or other relevant parameters that contribute to the alignment and conversion process. The data processing module 204 may involve data integration from multiple sources or data fusion techniques to combine different types of input data, enabling a more comprehensive analysis and alignment. The processed data from the data processing module 204 may be then passed on to subsequent modules within the accent conversion system 100, such as the phonetic embedding extraction module 206 or the accent conversion neural network module 208, for example, for further analysis and transformation.

The phonetic embedding extraction module 206 may extract phonetic embedding vectors from the phonetic content representing the source accent. The phonetic embedding extraction module 206 may capture and represent the phonetic characteristics of the input speech or audio data in a numerical format. The phonetic embedding vectors may encode essential information about phonemes, speech sounds, or other relevant phonetic units present in the input speech or audio data representing the source accent.

The phonetic embedding extraction module 206 may utilize various techniques, such as deep learning models, feature extraction algorithms, or linguistic analysis methods, to convert the acoustic or linguistic properties of the input speech or audio data into meaningful phonetic embedding vectors. These phonetic embedding vectors are typically high-dimensional numerical representations that capture the distinguishing phonetic features and patterns in the input speech or audio data representing the source accent.

To extract the phonetic embedding vectors, the phonetic embedding extraction module 206 may analyze different aspects of the input speech data, such as spectral features, pitch, formant frequencies, or other acoustic properties. The phonetic embedding extraction module 206 may also consider linguistic information, such as phoneme sequences or linguistic features derived from the input speech data.

The extraction process performed by the phonetic embedding extraction module 206 may involve mapping the input speech data into a latent space where phonetic similarities and differences are captured. This latent space representation may enable the subsequent alignment and conversion step(s) to compare and manipulate the phonetic content effectively, as explained in more detail below.

The extracted phonetic embedding vectors from the phonetic embedding extraction module 206 may serve as a compact and informative representation of the phonetic content in the input speech data associated with the source accent. These vectors may then be utilized by subsequent modules, such as the accent conversion neural network module 208 or the cosine distance calculation module 210, to perform alignment, conversion, and/or distance computations.

In particular, the accent conversion neural network module 208, may predict the transformed phonetic embedding vectors that represent the target accent based on the source accent. The accent conversion neural network module 208 may utilize machine learning models including deep learning techniques, specifically neural networks, to learn the mapping between the phonetic embedding vectors of the input speech data in the source accent and the corresponding transformed phonetic embedding vectors that embody the phonetic characteristics of speech data in the target accent. The accent conversion neural network module 208 may leverage the power of neural networks to capture complex patterns and relationships within the phonetic data.

The accent conversion neural network module 208 can include multiple layers, including an encoder layer and a decoder layer. The encoder layer may take the phonetic embedding vectors associated with the source accent as input and encode them into a latent representation, effectively capturing the unique phonetic features of the input speech data representing the source accent. The decoder layer may then decode this latent representation to generate the transformed phonetic embedding vectors that represent the target accent.

During the training phase, the accent conversion neural network module 208 may learn to predict the transformed phonetic vectors by adjusting the internal parameters based on a labeled dataset. This dataset may include paired samples of source accent phonetic embedding vectors and corresponding target accent phonetic embedding vectors. By iteratively adjusting the network parameters, the accent conversion neural network module 208 may optimize its predictions to minimize the difference between the predicted transformed vectors and the target accent vectors.

In some examples of the real-time accent conversion process described and illustrated by way of the examples herein, the accent conversion neural network module 208 may take the phonetic embedding vectors of the source accent as input and pass them through the accent conversion neural network. The internal computations of the neural network and learned transformations may enable the accent conversion neural network module 208 to generate the transformed phonetic embedding vectors that represent the target accent. The transformed phonetic embedding vectors may capture the phonetic characteristics and nuances of the target accent, allowing for a seamless conversion from the source accent to the target accent. Deep learning capabilities of the accent conversion neural network module 208 may make it capable of capturing subtle accent-specific details, resulting in accurate and effective accent conversion.

The cosine distance calculation module 210 in some examples is configured to calculate the cosine distance between the set of phonetic embedding vectors and the set of transformed phonetic embedding vectors. The cosine distance may measure similarity between two vectors that considers both their direction and magnitude. By jointly maximizing the cosine distance between the phonetic embedding vectors and the transformed phonetic embedding vectors, the cosine distance calculation module 210 may facilitate the alignment process described herein.

The cosine distance calculation module 210 is configured to normalize both sets of phonetic embedding vectors to have a unit norm. Normalization may involve scaling the phonetic embedding vectors to have a magnitude or length of one, while preserving their relative directions. This normalization may ensure that the phonetic embedding vectors are on a consistent scale and eliminate the influence of their magnitudes in the cosine distance calculation.

Once the phonetic embedding vectors are normalized, the cosine distance calculation module 210 may compute the dot product of the normalized phonetic embedding vectors. The dot product may measure the similarity of the phonetic embedding vectors based on their directions. By taking the dot product of the normalized phonetic embedding vectors, the cosine distance calculation module 210 may calculate the cosine distance between them, which provides a measure of alignment between the phonetic embedding vectors and the transformed phonetic embedding vectors. Maximizing the cosine distance may jointly align the phonetic embedding vectors in a way that minimizes their dissimilarity and maximizes their similarity.

The computed cosine distance may also serve as a feedback signal for the alignment module 212, enabling it to optimize and refine the alignment process. By maximizing the cosine distance, the alignment module 212 may achieve an improved alignment, enabling accurate and effective accent conversion. Accordingly, the alignment module 212 in some examples aligns the phonetic content of the input speech data associated with the source accent with the target accent based on the alignment obtained through the cosine distance maximization.

Once the cosine distance between the phonetic embedding vectors and the transformed phonetic embedding vectors is calculated, the alignment module 212 may utilize this information to perform an alignment process. The alignment module 212 may automatically align the phonetic content of the input speech data representing the source accent with the target accent to closely match each other. The alignment module 212 may operate at a frame-level granularity in some examples, aligning individual frames of the input speech data associated with the source accent with corresponding frames of the target accent. The fine-grained alignment may allow for relatively precise matching of the phonetic content between accents, capturing temporal characteristics of speech.

To achieve alignment, the alignment module 212 may employ various techniques such as time-warping functions. These functions may enable the temporal alignment of the phonetic content by stretching or compressing the frames of the speech data representing the source accent to match the corresponding frames of output speech data representing the target accent. The temporal alignment may ensure that the phonetic content is properly synchronized between the accents.

By performing automatic alignment, the alignment module 212 may facilitate transformation of the phonetic characteristics of the input speech data in the source accent to closely match those of the target accent. This alignment process may ensure that important phonetic features are preserved while adapting the phonetic content to the desired target accent. Thus, the alignment module 212 allows for seamless and efficient conversion of accents during speech processing and may ensure that the converted speech maintains the natural flow and rhythm while accurately reflecting the desired target accent.

The training module 214 is configured to train the accent conversion neural network by iteratively adjusting one or more phonetic parameters based on the alignment achieved through maximizing the cosine distance. During the training process, the training module 214 may use a dataset comprising paired samples of source accent phonetic embedding vectors and target accent phonetic embedding vectors. These paired samples may serve as the training data for the accent conversion neural network.

The training module 214 may employ a gradient-based optimization algorithm to optimize the joint maximization of the cosine distance. The gradient-based optimization algorithm may iteratively update the phonetic parameters of the accent conversion neural network based on the calculated gradients of a loss function, aiming to minimize the discrepancy between the predicted transformed phonetic embedding vectors and the target accent vectors.

By adjusting the phonetic parameters, the training module 214 may ensure that the accent conversion neural network learns to generate accurate and meaningful transformations of phonetic embedding vectors from the source accent to the target accent. The training process may allow the accent conversion neural network to capture the underlying patterns and relationships between the accents, enabling it to perform accurate accent conversion.

The training module 214 may fine-tune the ability of the accent conversion neural network to align and convert accents effectively. By continually updating the network parameters, the training module 214 may improve the accent conversion neural network performance and enhance its capability to produce high-quality transformed phonetic embedding vectors that closely match the target accent.

The training phase may be performed before deploying the accent conversion system 100 for real-time accent conversion and may involve multiple iterations and the adjustment of various phonetic parameters to achieve optimal performance. The training module 214 may enable the accent conversion neural network to learn and improve its accent conversion capabilities, leading to more accurate and reliable results in real-time accent conversion scenarios.

Once the alignment module 212 aligns the phonetic content of the source accent with the target accent, the aligned phonetic content may be passed to the output module 216 for further processing. The output module 216 in some examples is configured to generate speech output data that closely resembles the target accent while preserving the original linguistic content. The output module 216 may incorporate techniques such as prosody modeling, intonation adjustment, and/or accent-specific acoustic modeling for high quality, natural sounding, accurate and fluent speech production in the target accent.

The output module 216 may offer options for adjusting the speech characteristics, such as speech rate, pitch, or gender, to further customize the converted speech output based on user preferences or application requirements, for example. The output module 216 may deliver a seamless and intelligible speech output to reflect the desired target accent. By leveraging advanced speech synthesis techniques and models, the output module 216 may provide an accurate representation of the converted accent, allowing users to hear the converted speech output with the intended target accent in real-time or on-demand.

Figure 3:
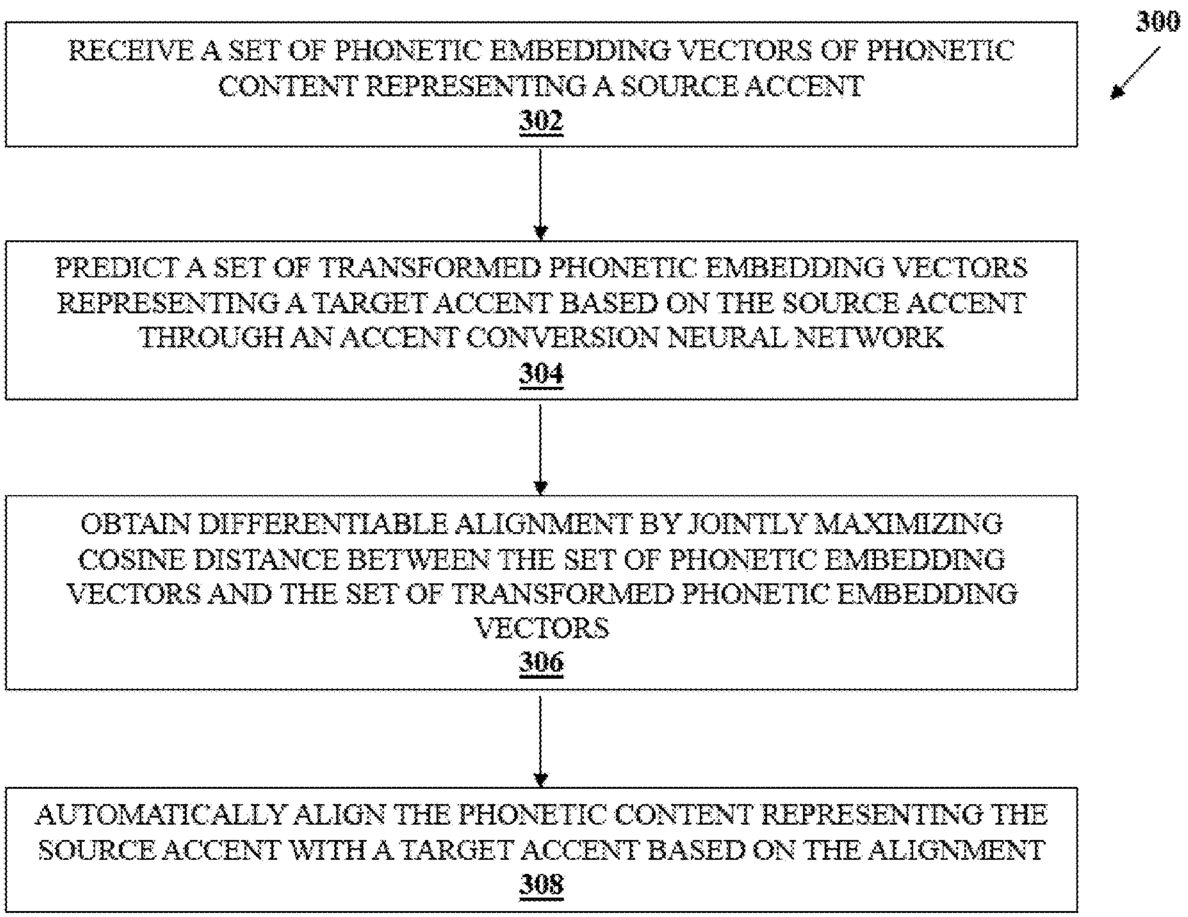
FIG. 3 is a flowchart of an exemplary method for automatic alignment of phonetic content for real-time accent conversion.

Referring now to FIG. 3, a flowchart of an exemplary method 300 for automatic alignment of phonetic content for real-time accent conversion is illustrated. In some examples, the method 300 may be implemented as a software application (e.g., software 116 executed by the central processing unit 102) or a module within a larger speech processing system. The software application or module may receive input audio data, perform automatic alignment, accent conversion, and provide the converted speech output in real-time, as explained in detail below In step 302 in this example, the accent conversion system 100 receives a set of phonetic embedding vectors of phonetic content representing a source accent. The phonetic content is associated with speech in the source accent as represented within audio data from which the phonetic embedding vectors are generated. The phonetic content representing the source accent can be associated with audio data captured (e.g., via a microphone) or obtained by the accent conversion system 100. Audio embeddings capture audio data, including speech, as numerical vectors, incorporating acoustic features and temporal patterns in the audio, for example. Thus, the phonetic embedding vectors in some examples capture important features related to pronunciation, intonation, and other phonetic aspects of the speech in the source accent.

In some examples, additional phonetic embedding vectors can be used that represent emotions or styles, for example. In this examples, the method 300 may align and convert not only accents but also emotional or stylistic aspects of the source speech, enabling more versatile and expressive accent conversion applications. The phonetic embedding vectors can be generated by a machine learning model (also referred to as an embedding model) trained to generate the phonetic embedding vectors from input audio data (e.g., audio data encapsulating the phonetic content representing the source accent).

In step 304, the accent conversion system 100 predicts a set of transformed phonetic embedding vectors representing a target accent based on the source accent through a trained accent conversion neural network. The target accent can be selected by a user and/or a stored default accent in some examples. Accordingly, the accent conversion neural network may be trained to predict a set of transformed phonetic embedding vectors that represent the target accent, based on input from the source accent. The accent conversion neural network may be trained by iteratively adjusting one or more parameters, utilizing the alignment achieved through maximizing the cosine distance between the source and target phonetic embedding vectors, which is described and illustrated in detail herein.

In some examples, the accent conversion system 100 trains the accent conversion neural network using a large dataset of aligned phonetic content pairs from multiple source and target accents, which allows the accent conversion neural network to learn a more generalized mapping between different accents, enhancing its accent conversion capabilities. Optionally, the accent conversion system 100 can subsequently preprocess the source and target phonetic embedding vectors (also referred to herein as the set of phonetic embedding vectors and the set of transformed phonetic embedding vectors, respectively) by applying dimensionality reduction techniques, such as Principal Component Analysis (PCA) or t-SNE (t-Distributed Stochastic Neighbor Embedding) to reduce the computational complexity and enhance the alignment accuracy.

In step 306, the accent conversion system 100 obtains differentiable alignment by jointly maximizing cosine distance between the set of phonetic embedding vectors and the set of transformed phonetic embedding vectors. To ensure accurate alignment, the accent conversion system 100 employs a joint maximization of the cosine distance between the set of phonetic embedding vectors and the set of transformed phonetic embedding vectors, which allows for alignment and enables a smooth and seamless transition between source and target accents. In one example, the joint maximization of the cosine distance between the set of phonetic embedding vectors and the set of transformed phonetic embedding vectors may be performed using a gradient-based optimization algorithm.

Optionally, the phonetic embedding vectors and the predicted set of transformed phonetic embedding vectors can be normalized to have a unit norm, which ensures that the phonetic embedding vectors are scaled to a standardized length, specifically a magnitude of one, using mathematical calculations, such as dividing each component of each of the phonetic embedding vectors by its Euclidean norm or another appropriate norm. Normalization may involve scaling the phonetic embedding vectors to have a unit norm, followed by computing a dot product of the normalized phonetic embedding vectors, for example.

The normalization may create a consistent scale for the phonetic embedding vectors, allowing for effective comparisons and calculations based on their direction or relative positions rather than their magnitudes. In other words, by normalizing the phonetic embedding vectors to a unit norm, their magnitudes are equalized, and the focus may be shifted towards their orientations or relationships.

Thus, a unit norm for the phonetic embedding vectors and the predicted set of transformed phonetic embedding vectors may be used for calculating the cosine distance. The cosine distance is a measure of the angle between two vectors and may be used to quantify their similarity or dissimilarity. The cosine distance calculation may be more accurate and reliable by normalizing the phonetic embedding vectors to have a unit norm, leading to relatively precise alignment. Accordingly, in some examples, the accent conversion system 100 calculates the cosine distance between the normalized phonetic embedding vectors and the predicted set of transformed phonetic embedding vectors to facilitate the alignment process and allow for efficient comparison between the source and target accents.

In step 308, the accent conversion system 100 automatically aligns the phonetic content of the source accent with the target accent based on the differentiable alignment obtained in step 306 to generate output audio data with phonetic content representing the target accent. The alignment of step 308 advantageously guarantees a relatively precise matching of the phonetic characteristics of the speech in the source and target accents, resulting in a highly accurate and natural-sounding accent conversion.

In some examples, the accent conversion system 100 incorporates a language model or a phonetic dictionary to improve the alignment accuracy. The language model or dictionary may provide additional context and phonetic information, enabling better alignment of the phonetic content between the source and target accents. In yet other examples, the accent conversion system 100 may incorporate a feedback loop mechanism that enables iterative refinement of the alignment and accent conversion by continuously comparing the converted phonetic content with the target accent and adjusting the accent conversion neural network parameters accordingly. Thus, the alignment of step 308 may enable end-to-end training of the accent conversion neural network.

Optionally, the accent conversion system 100 may utilize a speaker adaptation module that adapts the accent conversion method 300 based on the specific characteristics of the speaker's voice (i.e., the speaker associated with the speech content of the input audio data from which the set of phonetic embedding vectors of phonetic content is generated), thereby improving the accuracy and naturalness of the converted speech for individual speakers. In some examples of this technology, the alignment of step 308 is about twenty times faster than alignment achieved using dynamic time warping (DTW).

With this technology, an alignment between a set of phonetic embedding vectors representing a source accent and a set of transformed phonetic embedding vectors representing a target accent is advantageously derived for real-time accent conversion. The technology disclosed herein may be differentiable, may provide gradient, and may allow for more efficient and effective training of a real-time accent conversion system 100.

This technology has numerous practical applications, such as accent modification in speech synthesis, language learning tools, and cross-accent speech recognition. Moreover, the real-time capability of this technology ensures efficient and seamless accent conversion during speech processing, which enables users to communicate more effectively across different accents. The disclosed technology can be applied to non-native speakers learning a new accent in some implementations. By aligning the phonetic content of the learner's native accent with the target accent, this technology may facilitate accent acquisition and help learners improve their pronunciation and intonation.

In yet other applications, this technology can be used with voice assistants and virtual agents. By automatically aligning and converting accents in real-time, these voice assistant and virtual agent systems may provide a more personalized and natural user experience, which enables effective communication between the user and the voice assistant or virtual agent, regardless of the user's accent. The voice assistants and virtual agents may adapt to different accents, enhancing their ability to understand and respond to users'queries and requests.

This technology may also be applicable to multilingual communication systems, such as call centers or language translation services. Specifically, the disclosed technology enables seamless accent conversion by aligning and converting the accents of both the caller and the recipient, which facilitates smooth communication and overcomes potential barriers caused by diverse accents and thereby improves the overall quality and efficiency of multilingual interactions.

Moreover, this technology is applicable to the media and entertainment industries as it may be utilized to modify the accents of actors or voice-over artists to match specific roles or characters. By automatically aligning and converting accents, this technology enhances the authenticity and consistency of accents portrayed in movies, television shows, and other forms of media, which may improve the overall quality and realism of the content and enhance the viewer's experience.

Further, the automatic alignment of phonetic content described and illustrated by way of the examples herein may also benefit speech recognition and natural language processing (NLP) systems. By converting diverse accents into a common reference accent, this technology may improve the accuracy and performance of such systems, which may enable better understanding and interpretation of spoken input, enhance speech recognition, transcription, and language understanding capabilities, and be particularly useful in applications such as voice dictation, transcription services, and language understanding platforms.

Having thus described the basic concept of the invention, it will be rather apparent to those skilled in the art that the foregoing detailed disclosure is intended to be presented by way of example only and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order.

What is claimed is:

1. A system, comprising an audio interface, a communication interface, memory having instructions stored thereon, and one or more processors coupled to the memory and configured to execute the instructions to:

receive output audio data representing a target accent and comprising speech data aligned to phonetic content representing a source accent based on a differentiable alignment determined based on first and second phonetic embedding vectors, wherein:

the first phonetic embedding vectors are generated from input audio data and are for the phonetic content; and the second phonetic embedding vectors are generated based on an application of a trained neural network to the first phonetic embedding vectors and correspond to first phonetic characteristics of the speech data in the target accent;

store the output audio data in the memory; and output the output audio data from the memory and via the audio interface.

2. The system of claim 1, wherein the first phonetic embedding vectors represent second phonetic characteristics of input speech in the input audio data in a numerical format.

3. The system of claim 1, wherein the trained neural network comprises an encoder layer configured to encode the first phonetic embedding vectors into a latent representation and a decoder layer configured to decode the latent representation to generate the second phonetic embedding vectors.

4. The system of claim 1, wherein the differentiable alignment is determined based a distance between the first phonetic embedding vectors and the second phonetic embedding vectors.

5. The system of claim 4, wherein the distance is a cosine distance determined based on a generated dot product of a normalization of the first and second phonetic embedding vectors based on a scaling of the first and second phonetic embedding vectors to have a magnitude of one and a preservation of a relative direction of the first and second phonetic embedding vectors.

6. The system of claim 5, wherein the cosine distance is optimized based on an application of a gradient-based optimization algorithm.

7. The system of claim 1, wherein the trained neural network is trained to learn a mapping between the first phonetic embedding vectors and the second phonetic embedding vectors using a labeled dataset comprising paired samples of source accent phonetic embedding vectors and corresponding target accent phonetic embedding vectors.

8. One or more non-transitory computer-readable media having stored thereon instructions comprising executable code that, when executed by one or more systems, is configured to cause the one or more systems to:

receive output audio data representing a target accent and comprising speech data aligned to phonetic content representing a source accent based on a differentiable alignment determined based on first and second phonetic embedding vectors, wherein:

the first phonetic embedding vectors are generated from input audio data and are for the phonetic content; and the second phonetic embedding vectors are generated based on an application of a trained neural network to the first phonetic embedding vectors and correspond to first phonetic characteristics of the speech data in the target accent; and output the output audio data via an audio interface.

9. The one or more non-transitory computer-readable media of claim 8, wherein the first phonetic embedding vectors encode one or more of phonetic features, patterns, phonemes, pronunciation, intonation, speech sounds, or phonetic units present in input speech in the input audio data.

10. The one or more non-transitory computer-readable media of claim 8, wherein the output audio data is further generated based on an alignment of first frames of the speech data with corresponding second frames of the phonetic content.

11. The one or more non-transitory computer-readable media of claim 8, wherein the output audio data is further generated based on an application of one or more techniques comprising prosody modeling, intonation adjustment, or accent-specific acoustic modeling.

12. The one or more non-transitory computer-readable media of claim 8, wherein the differentiable alignment is determined based on a distance between the first phonetic embedding vectors and the second phonetic embedding vectors.

13. The one or more non-transitory computer-readable media of claim 8, wherein the output audio data preserves linguistic content of the input audio data.

14. A method, comprising:

receiving output audio data representing a target accent and comprising speech data aligned to phonetic content representing a source accent based on a differentiable alignment determined based on first and second phonetic embedding vectors, wherein:

the first phonetic embedding vectors are generated from input audio data and are for the phonetic content; and the second phonetic embedding vectors are generated based on an application of a trained neural network to the first phonetic embedding vectors and correspond to first phonetic characteristics of the speech data in the target accent; and outputting the output audio data via an audio interface, wherein the output audio data represents an accent-converted version of the input audio data.

15. The method of claim 14, wherein the first and second phonetic embedding vectors are pre-processed based on an application of one or more dimensionality reduction techniques.

16. The method of claim 14, wherein the first phonetic embedding vectors represent second phonetic characteristics of input speech in the input audio data in a numerical format.

17. The method of claim 14, wherein the trained neural network comprises an encoder layer configured to encode the first phonetic embedding vectors into a latent representation and a decoder layer configured to decode the latent representation to generate the second phonetic embedding vectors.

18. The method of claim 14, wherein the differentiable alignment is determined based on a cosine distance between the first phonetic embedding vectors and the second phonetic embedding vectors.

19. The method of claim 14, wherein the trained neural network is trained to learn a mapping between the first phonetic embedding vectors and the second phonetic embedding vectors using a labeled dataset comprising paired samples of source accent phonetic embedding vectors and corresponding target accent phonetic embedding vectors.

20. The method of claim 14, wherein the output audio data preserves linguistic content of the input audio data.

* * * * *